(12) United States Patent
Schnittger

(10) Patent No.: US 11,460,055 B2
(45) Date of Patent: Oct. 4, 2022

(54) AIR PREPARATION DEVICE FOR MOTOR VEHICLES

(71) Applicant: KNORR-BREMSE SYSTEME FUER NUTZFAHRZEUGE GMBH, Munich (DE)

(72) Inventor: Karsten Schnittger, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 260 days.

(21) Appl. No.: 16/755,898

(22) PCT Filed: Oct. 2, 2018

(86) PCT No.: PCT/EP2018/076711
§ 371 (c)(1),
(2) Date: Apr. 14, 2020

(87) PCT Pub. No.: WO2019/076621
PCT Pub. Date: Apr. 25, 2019

(65) Prior Publication Data
US 2020/0240446 A1    Jul. 30, 2020

(30) Foreign Application Priority Data
Oct. 19, 2017   (DE) .................. 10 2017 124 383.6

(51) Int. Cl.
*F15B 21/048*   (2019.01)
*B60T 17/00*   (2006.01)
(Continued)

(52) U.S. Cl.
CPC ........ *F15B 21/048* (2013.01); *B01D 53/0446* (2013.01); *B01D 53/22* (2013.01);
(Continued)

(58) Field of Classification Search
CPC ...................... B01D 53/0446; B01D 53/0454; B01D 53/22; B01D 53/261; B01D 2257/80;
(Continued)

(56) References Cited

U.S. PATENT DOCUMENTS 4,806,134 A * 2/1989 Lhota ................. B01D 53/0454
                                                        55/DIG. 17
8,490,641 B2   7/2013 Schnittger et al.
(Continued)

FOREIGN PATENT DOCUMENTS

DE   102007013673 A1   9/2008
DE   102014111523 A1   2/2016
(Continued)

OTHER PUBLICATIONS

International Search Report dated Jan. 25, 2019 of the corresponding International Application PCT/EP2018/076711.

*Primary Examiner* — Frank M Lawrence, Jr.
(74) *Attorney, Agent, or Firm* — Norton Rose Fulbright US LLP; Gerard Messina

(57) ABSTRACT

An air-preparation device for a motor vehicle, including: at least one first compressed air connection and a second compressed air connection; and a first air-preparation component and a second air-preparation component; wherein the first air-preparation component has at least one first solenoid valve, a second solenoid valve and a third solenoid valve, a first air drier cartridge, a first main nonreturn valve, a first regeneration nonreturn valve, a first regeneration throttle and a first inlet valve, wherein the second air-preparation component has at least one second air drier cartridge, a second main nonreturn valve, a second regeneration nonreturn valve, a second regeneration throttle and a second inlet valve, wherein the first solenoid valve and the second solenoid valve are for controlling the first air-preparation component, and wherein a control line is configured so that (Continued)

the second air-preparation component is connected to the third solenoid valve of the first air-preparation component.

6 Claims, 2 Drawing Sheets

(51) Int. Cl.
   *B01D 53/04* (2006.01)
   *B01D 53/22* (2006.01)
   *F15B 21/044* (2019.01)
   *F15B 21/14* (2006.01)
(52) U.S. Cl.
   CPC ............ *F15B 21/044* (2013.01); *F15B 21/14* (2013.01); *B01D 2257/80* (2013.01); *B01D 2259/40086* (2013.01); *B01D 2259/4566* (2013.01); *B60T 17/004* (2013.01)
(58) Field of Classification Search
   CPC .. B01D 2259/40086; B01D 2259/4566; B60T 17/004; F15B 21/044; F15B 21/048; F15B 21/14
   USPC ............... 96/121, 143, 144; 34/80, 472, 473
   See application file for complete search history.

(56) References Cited

U.S. PATENT DOCUMENTS

| 8,894,752 | B2* | 11/2014 | Ginder | ................. B60T 17/004 96/116 |
| 2012/0031273 | A1* | 2/2012 | Heer | .................... B01D 53/261 96/116 |
| 2015/0217744 | A1* | 8/2015 | Minato | ............. B01D 53/0454 96/116 |

FOREIGN PATENT DOCUMENTS

| DE | 102016003311 A1 | 9/2017 |
| EP | 2407231 A1 | 1/2012 |
| EP | 2829744 A2 | 1/2015 |
| WO | 2017050408 A1 | 3/2017 |

* cited by examiner

AIR PREPARATION DEVICE FOR MOTOR VEHICLES

FIELD OF THE INVENTION

The present invention relates to an air preparation device for motor vehicles, in particular an air preparation device with at least one first compressed air connection and a second compressed air connection, a first air preparation component and a second air preparation component.

For parking brakes (also called handbrakes) of utility vehicles or other pneumatic circuits of motor vehicles, in particular of tractor vehicles with a trailer, use is made of air driers which clean and dry the oil- and water-containing compressed air coming from a compressed air source before said compressed air is made available to the various pneumatic circuits of the motor vehicle.

If the drying agent of the air drier or of the air drier cartridge is saturated, some of the previously prepared compressed air is conducted away outward through the air drier or the air drier cartridge counter to the customary flow direction. Regeneration of the air drier or of the air drier cartridge is thereby possible.

However, in certain custom-made applications, in particular in the region of trucks, there is such a high air consumption that no time remains to regenerate the air drier or the air drier cartridge. In this case, use is made of special double air driers, on the housing of which two air driers or air drier cartridges are mounted. By means of an interconnection of the two air driers or air drier cartridges, one air drier always cleans the inflowing compressed air while the other air drier is regenerated.

However, double air driers of this type are complicated configurations which are tailored specially to the intended use and are used only for a few custom-made applications. Double air driers of this type are very expensive because of the complex structure and the low piece numbers.

SUMMARY OF THE INVENTION

It is therefore an object of the present invention to advantageously develop an air preparation device of the type mentioned at the beginning, in particular to the effect that an air preparation device can be simply constructed, can be produced and maintained favorably and can be regenerated in a controlled manner.

This object may be achieved according to the invention by an air preparation device with the features described herein. According thereto, an air preparation device for motor vehicles is provided with at least one first compressed air connection and a second compressed air connection, and a first air preparation component and a second air preparation component.

The first air preparation component has at least one first solenoid valve, a second solenoid valve and a third solenoid valve, a first air drier cartridge, a first main nonreturn valve, a first regeneration nonreturn valve, a first regeneration throttle and a first inlet valve.

The second air preparation component has at least one second air drier cartridge, a second main nonreturn valve, a second regeneration nonreturn valve, a second regeneration throttle and a second inlet valve.

The first solenoid valve and the second solenoid valve are provided for controlling the first air preparation component.

Furthermore, a control line is provided in such a manner that the second air preparation component is connected to the third solenoid valve of the first air preparation component.

The invention is based on the basic concept that the second air preparation unit is a separate unit, and therefore the first and the second air preparation unit are controllable independently of each other. Thus, compressed air prepared in each case can be provided, and/or the respectively associated air drier cartridge can be regenerated, by means of the at least two air preparation units, in particular also in an alternating manner to one another. In particular, it is thereby possible to use, for example, two conventional or standard air preparation components (such as drier canisters, drier cartridges) and to interconnect same in such a manner that therefore in each case and always one air preparation component can also be used for drying air while the other air preparation component can regenerate.

In particular, the air preparation device according to the invention can be usable for a parking brake device of a motor vehicle.

In this context, a motor vehicle, in particular a utility vehicle, may be understood as meaning a tractor vehicle with at least one trailer.

With the air preparation device according to the invention, it is possible at least substantially to use standard air preparation components each having a drying agent or a drying agent cartridge.

In respect of the first air preparation component, in comparison to components already used as standard, it is merely necessary to add the third solenoid valve.

In this way, an independent, autonomous control of the second air preparation component by means of the third solenoid valve, and of the first air preparation component by means of the first and second solenoid valves can be provided.

Simple and favorable preparation and advantageous maintenance of the air preparation device according to the invention can be provided by means of standard air preparation components.

In particular, the air preparation device according to the invention can be provided in such a manner that the first air preparation component is usable or installable in a known manner. In comparison to existing systems, primarily the second air preparation component has to be added according to the invention to the air preparation device.

The first and second air preparation component, in particular an air drier or an air drier cartridge or air drier canister, are substantially comparable to components conventionally used in individual air driers for standard applications in a motor vehicle.

Furthermore, the first, second and third solenoid valves may be provided in the form of spring-loaded 3/2-way directional control valves, in particular normally closed 3/2-way directional control valves. Normally closed can mean in particular that there is no connection between input and output of the valve or at least no connection is provided to a pneumatic line with high fluid pressure or air pressure.

The air preparation device, in particular the first air preparation component, can have a control unit for controlling the first, second and third solenoid valves.

Furthermore, a connection between the first and second air preparation component is provided by means of the control line, thus permitting an advantageous use.

The air preparation components are interconnected in such a manner that in each case one air drier component or in each case one air drier cartridge can be used for preparing air while the other air drier component or air drier cartridge can be, for example, regenerated.

Within the context of the present invention, the at least first and second air drier component or the first and second air drier cartridge can be used or regenerated independently of one another or simultaneously for preparing air.

It can furthermore be provided that an output of the third solenoid valve is connected or connectable by means of the control line to an input of the second regeneration nonreturn valve and to a control input of the second inlet valve in such a manner that the second air preparation component is controllable by means of the third solenoid valve.

In general, it should be taken into consideration that, within the context of the present invention, nonreturn valves open up or block a flow path in a manner always corresponding to the pressure gradient present between respective input and output.

By means of the third solenoid valve, a high or a low fluid pressure or air pressure can be provided in the control line. By virtue of the fact that the control line is connected to the control input of the second inlet valve, the inlet valve can be switched over.

The second inlet valve, like the first inlet valve, can be provided both for supplying fresh compressed air from the compressed air connection to the second or first air drier cartridge and also for letting compressed air saturated with moisture out of the second or first air drier cartridge during the regeneration.

In conjunction with the second air drier cartridge, it is possible for preparation of air or regeneration to be set or controlled at the second air preparation component via the third solenoid valve of the first air preparation component.

Furthermore, it can be provided that an input of the first main nonreturn valve is connected to an output of the first air drier cartridge and an input of the second main nonreturn valve is connected to an output of the second air drier cartridge, wherein an output of the first main nonreturn valve and an output of the second main nonreturn valve are each connected to a first pneumatic circuit output.

By means of the first or second air preparation component, prepared compressed air can be provided to the first pneumatic circuit output via the respectively assigned compressed air connection, the respective inlet valve, the respective air drier cartridge and the respective main nonreturn valve.

A connection is available in particular between the first or second air drier cartridge and a first pneumatic circuit output for providing prepared compressed air for a following pneumatic circuit, such as, for example, a braking system.

Prepared compressed air from the first and second air preparation component may be provided to the same pneumatic circuit output in order, for example, to permit a continuing supply with prepared compressed air during the regeneration of one of the at least two air drier cartridges.

Furthermore, the second solenoid valve can be arranged in such a manner that an input of the second solenoid valve is connected to a second pneumatic circuit output and the output of the second solenoid valve is connected to the first regeneration nonreturn valve and to a control input of the first inlet valve.

Of course, depending on the configuration of downstream pneumatic circuits, the first and second pneumatic circuit output can also be provided in the form of an individual pneumatic circuit output.

Prepared compressed air may always be present at the at least one first pneumatic circuit output, and therefore a high fluid pressure or air pressure is present.

Regeneration of the first air drier cartridges via the second solenoid valve is controllable by the second solenoid valve being connected at its output to the first regeneration nonreturn valve and to the control input of the first inlet valve.

In particular, prepared compressed air can be supplied from the second pneumatic circuit output by the second solenoid valve via the first regeneration nonreturn valve as far as the first air drier cartridge.

Owing to the connection to the control input of the first inlet valve, a high air pressure of the prepared compressed air can bring about switching of the first inlet valve. A connection between the first compressed air connection and the first air drier cartridge can thus be disconnected.

The first inlet valve can be provided here in such a manner that, by switching over via the control input by means of the second solenoid valve, the first air drier cartridge is connected to a venting output of the first inlet valve.

The prepared compressed air is supplied to the first air drier cartridge by means of the second solenoid valve via the first regeneration nonreturn valve and can be let out via the venting output of the first inlet valve.

In the same manner, the interconnection of the second air preparation component, in particular of the second air drier cartridge, to the second regeneration nonreturn valve and to the second inlet valve can also be provided in order to permit control by means of the third solenoid valve.

It can furthermore be provided that the first and/or second inlet valve is configured as a 3/2-way directional control valve, wherein a venting output of the first and/or second inlet valve is connected to a first or a second regeneration output.

By the control inputs of the first and/or second inlet valve being connected to the second or third solenoid valve, switching over between preparation of air and regeneration can advantageously be controlled by means of the second or third solenoid valve, in each case independently of one another.

By means of the configuration in the form of an in particular spring-loaded 3/2-way directional control valve, the supply of fresh compressed air of the first or second compressed air connection is in each case possible as required with the first or second inlet valve. Similarly, the first or second air drier cartridge can be regenerated by switching over of the first or second inlet valve.

Alternatively, the first and/or second inlet valve can be configured in the form of in each case two 2/2-way directional control valves with an autonomous inlet valve and an autonomous venting valve.

The control input of the inlet valve and a control input of a venting valve can in each case be connected in this manner to the second solenoid valve or to the third solenoid valve. Simultaneous switching of the respective 2/2-way directional control valves is thus possible for the first and/or second air preparation component, for example for changing into the regeneration mode.

Furthermore, a rapid venting valve can be provided in such a manner that an input of the first solenoid valve is connected to the second pneumatic circuit output and an output of the first solenoid valve is connected to the rapid venting valve.

The rapid venting valve is not a solenoid valve, but rather is opened in the direction of a consumer by the feed pressure and opens up its exhaust air connection by means of the consumer pressure when switching over takes place.

The rapid venting valve is, for example, what is referred to as an ESS valve.

In one activation state, an exhaust air connection of the rapid venting valve is closed. In a venting state which can be brought about in a targeted manner, the exhaust air connection is opened up.

In this way, rapid venting of the second pneumatic circuit output as required is available as required and independently of the first or second air drier cartridge.

As already explained above, the second pneumatic circuit output can be connected or can be identical to the first pneumatic circuit output.

The configuration of the first air preparation component according to the invention with the first, second and third solenoid valves makes completely independent handling of the first air drier cartridge and of the second air drier cartridge possible.

In particular, the following combinations of various operating modes arise for the first and second air preparation component in the context of the air preparation device according to the invention.

The first and second air preparation components can both be active, wherein compressed air prepared by the two air preparation components is made available at the first pneumatic circuit output.

The first and second air preparation components can both be inactive, wherein neither compressed air is prepared nor is the first or second air drier cartridge regenerated.

The first and second air preparation components can both be regenerated, wherein prepared compressed air is conducted through the first and second air drier cartridges and conducted out of the system.

The first or second air drier cartridge can be regenerated, wherein the second or first air preparation component provides prepared compressed air at the same time.

The first regeneration throttle can be integrated in the second solenoid valve.

It is furthermore conceivable that the second regeneration throttle is integrated in the third solenoid valve.

Further details and advantages of the invention will now be explained with reference to exemplary embodiments which are illustrated in more detail in the drawings.

DETAILED DESCRIPTION

Figure 1:
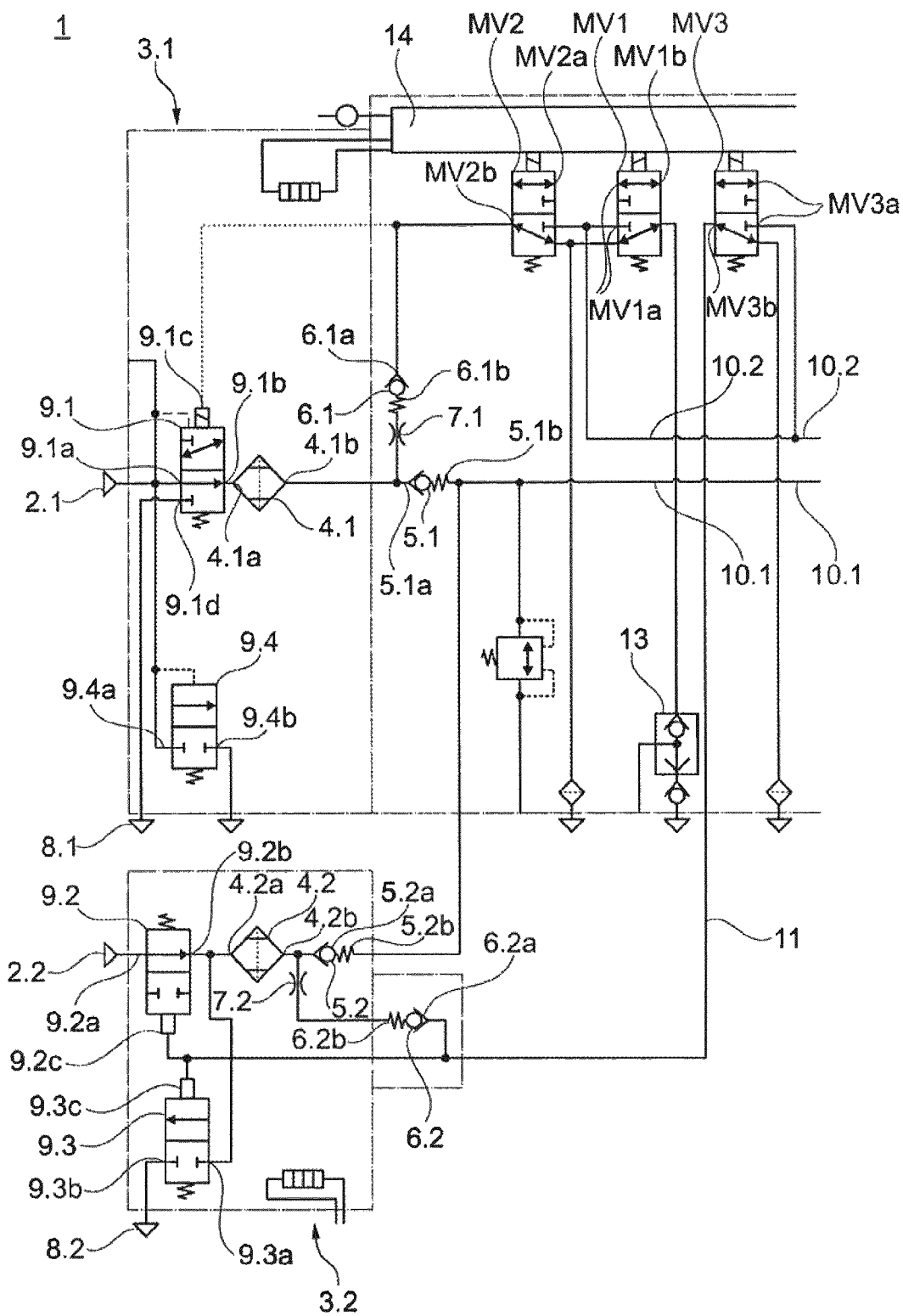
FIG. 1 shows an exemplary embodiment of an air preparation device with a first and second air preparation component.

FIG. 1 shows, in a schematic illustration, an air preparation device 1 for motor vehicles according to a first exemplary embodiment.

FIG. 1 shows the air preparation device 1 with at least one first compressed air connection 2.1 and a second compressed air connection 2.2, and a first air preparation component 3.1 and a second air preparation component 3.2.

The first air preparation component 3.1 is illustrated with a first inlet valve 9.1, a first air drier cartridge 4.1, a first main nonreturn valve 5.1, a first regeneration nonreturn valve 6.1 and a first regeneration throttle 7.1. Furthermore, the first air preparation component 3.1 has a first, a second and a third solenoid valve MV1; MV2; MV3.

The first inlet valve 9.1 is configured, according to FIG. 1, in the form of a 3/2-way directional control valve.

An input 9.1a of the first inlet valve 9.1 is connected to the first compressed air connection 2.1. An output 9.1b of the first inlet valve 9.1 is connected to an input 4.1a of the first air drier cartridge 4.1.

According to FIG. 1, the first inlet valve 9.1 is switched in such a manner that preparation of compressed air takes place.

Fresh compressed air can thus be supplied for preparation to the first air drier cartridge 4.1.

An output 4.1b of the first air drier cartridge 4.1 is furthermore connected to an input 5.1a of the first main nonreturn valve 5.1. An output 5.1b of the main nonreturn valve 5.1 is connected to a first pneumatic circuit output 10.1.

Prepared compressed air can be transferred from the first air drier cartridge 4.1 to the first pneumatic circuit output 10.1 via the main nonreturn valve 5.1.

The first main nonreturn valve 5.1 here opens up the flow path to the first pneumatic circuit output in a manner corresponding to the pressure gradient.

For regeneration of the first air drier cartridge 4.1, the first inlet valve 9.1 is brought into a disconnected switching position, and therefore there is no connection between input 9.1a and output 9.1b.

For this purpose, a control input 9.1c of the first inlet valve 9.1 is connected to an output MV2b of the second solenoid valve MV2.

An input MV2a of the second solenoid valve MV2 is connected to a second pneumatic circuit output 10.2 of the first air preparation component 3.1.

Furthermore, a control unit 14 is provided for activating the first, second and third solenoid valve MV1; MV2; MV3.

Prepared compressed air can thus be recycled as required from the second pneumatic circuit output 10.2 via the input MV2a and the output MV2b of the second solenoid valve MV2. The first inlet valve 9.1 is switched over using the pressure present at the control input 9.1c, in order to regenerate the first air drier cartridge 4.1.

Furthermore, the first regeneration nonreturn valve 6.1 and the first regeneration throttle 7.1 are provided between the output MV2b of the second solenoid valve MV2 and the output 4.1b of the first air drier cartridge 4.1.

The input 6.1a of the first regeneration nonreturn valve 6.1 is connected to the output MV2b of the second solenoid valve MV2, wherein the output 6.1b is connected to an output 4.1b of the first air drier cartridge 4.1.

For the purposes of regeneration, prepared compressed air can be supplied from the second pneumatic circuit output 10.2 to the first air drier cartridge 4.1 by means of the second solenoid valve MV2 via the first regeneration nonreturn valve 6.1 and the first regeneration throttle 7.1 as required.

From the first air drier cartridge 4.1, the saturated compressed air is guided via the output 9.1b and a venting output 9.1d of the first inlet valve 9.1 to a first regeneration output 8.1 of the first air preparation component 3.1 and let out of the system.

In the event of regeneration with the first inlet valve 9.1 switched into a disconnected state, a drainage valve 9.4 is provided according to FIG. 1.

The drainage valve 9.4, in particular an input 9.4a, is connected to the first compressed air connection 2.1 and to the input 9.1a of the first inlet valve 9.1.

Thus, during a situation in which the system pressure lies above the permissible value, excess compressed air can be let out of the first compressed air connection 3.1 via the drainage valve 9.4, in particular via an output 9.4b.

If a compressor or another compressed air source is connected to the first compressed air connection, the compressed air source can continue to convey compressed air even during the regeneration of the first air drier cartridge and with the first inlet valve 9.1 switched to a disconnected state. A compressor or the like can therefore be operated continuously.

An input MV1a of the first solenoid valve MV1 is connected to the second pneumatic circuit output 10.2. An output MV1b of the first solenoid valve MV1 is connected to a rapid venting valve 13.

It is thus possible to let prepared compressed air out of the second pneumatic circuit output 10.2 by means of the first solenoid valve MV1 via the rapid venting valve 13 as required.

In particular, the first, second and third solenoid valves MV1; MV2; MV3 are switchable independently of one another by the control unit 14.

The second pneumatic circuit output 10.2 can be rapidly vented independently of a regeneration or preparation of compressed air, for example, of the first air preparation component 3.1.

According to FIG. 1, the air preparation device 1 is furthermore provided with a second air preparation component 3.2.

The second air preparation component 3.2 is illustrated with a second compressed air connection 2.2, a second inlet valve 9.2, a venting valve 9.3, a second air drier cartridge 4.2, a second main nonreturn valve 5.2, a second regeneration nonreturn valve 6.2 and a second regeneration throttle 7.2.

According to FIG. 1, the second inlet valve 9.2 and the venting valve 9.3 are switched in such a manner that preparation of compressed air takes place.

In particular, an output 9.2b is connected to an input 9.2a of the second inlet valve 9.2 in such a manner that compressed air from the second compressed air connection 2.2 can be introduced into the second air drier cartridge 4.2 via an input 4.2a.

Prepared compressed air can be transferred from an output 4.2b of the second air drier cartridge 4.2 to an input 5.2a of the second main nonreturn valve 5.2.

An output 5.2b of the second main nonreturn valve 5.2 is connected to the first pneumatic circuit output 10.1, and therefore prepared compressed air can be brought together from the second air preparation component 3.2 and the first air preparation component 3.1 and can be made available for downstream pneumatic circuits.

The second air preparation component 3.2 is connected via a control line 11 to an output MV3b of the third solenoid valve MV3.

In particular, according to FIG. 1, an input 6.2a of the regeneration nonreturn valve 6.2, a control input 9.2c of the second inlet valve 9.2 and an output 9.3a and a control input 9.3c of the venting valve 9.3 are connected via the control line 11 to the output MV3b of the third solenoid valve MV3.

An input MV3b of the third solenoid valve MV3 is connected to the second pneumatic circuit output 10.2 which may have a high fluid pressure or air pressure.

As soon as the third solenoid valve MV3 is switched to a continuous state, i.e. there is a connection between input MV3a and output MV3b, the compressed air transferred to the control inputs 9.2c; 9.3c of the second inlet valve 9.2 and of the venting valve 9.3 brings about switching of the second inlet valve 9.2 and of the venting valve 9.3 into the regeneration mode.

The second inlet valve 9.2, as an alternative to the first inlet valve 9.1, is configured in the form of a spring-loaded 2/2-way directional control valve. Accordingly, the second air preparation component has a further, separate venting valve 9.3 in the form of a 2/2-way directional control valve.

In the regeneration mode, the inlet valve 9.2 is switched to a disconnected state because of the compressed air present at the control input 9.2c, and therefore there is no connection between the input 9.2a and the output 9.2b. Compressed air cannot be transferred from the second compressed air connection 2.2 to the second air drier cartridge 4.2.

For the regeneration of the second air drier cartridge 4.2, the compressed air can flow from the third solenoid valve MV3 via the control line 11 to an input 6.2a of the second regeneration nonreturn valve 6.2.

Within the meaning of the pressure gradient which is present, the compressed air can pass out of the control line 13 from the input 6.2a to the output 6.2b of the second regeneration nonreturn valve 6.2.

From the output 6.2b of the second regeneration nonreturn valve 6.2, the prepared compressed air originating from the second pneumatic circuit output 10.2 passes via the second regeneration throttle 7.2 as far as the output 4.2b of the second air drier cartridge 4.2.

From the input 4.2a of the second air drier cartridge 4.2, the saturated compressed air can flow to the input 9.3a of the venting valve 9.3.

For the regeneration mode of the second air drier cartridge 4.2, the venting valve 9.3 is switched to a passage state by means of the control input 9.3c, and therefore the input 9.3a and the output 9.3b are connected to each other.

The output 9.3b of the venting valve 9.3 is connected to a second regeneration output 8.2.

Compressed air, which is saturated with moisture and oil, from the regeneration of the second air drier cartridge 4.2 can thus be let out of the system via the output 9.3b of the venting valve 9.3 and the second regeneration output 8.2.

The first air preparation component 3.1 is also called "master" since it can control the second air preparation component 3.2 (in particular via the third solenoid valve MV3). The air preparation component 3.2 is therefore also called "slave".

An advantage of this arrangement is, for example, that the two air preparation components "master" and "slave" can be based on standard components and can thus be operated from the same module construction set for air preparation components. Complicated custom-made adaptation are thus not required. As a result, cost advantages over known double air driers are also achieved since said double air driers are a custom-made product or a custom-made construction. In addition, the air preparation component "master" can be installed in the utility vehicle at the same location as the standard pipework, as is otherwise also customary in the case of utility vehicles from series production. Only the additional component "slave" has to be added, which component is likewise based on standard components and merely requires a corresponding connection and pipework.

Figure 2:
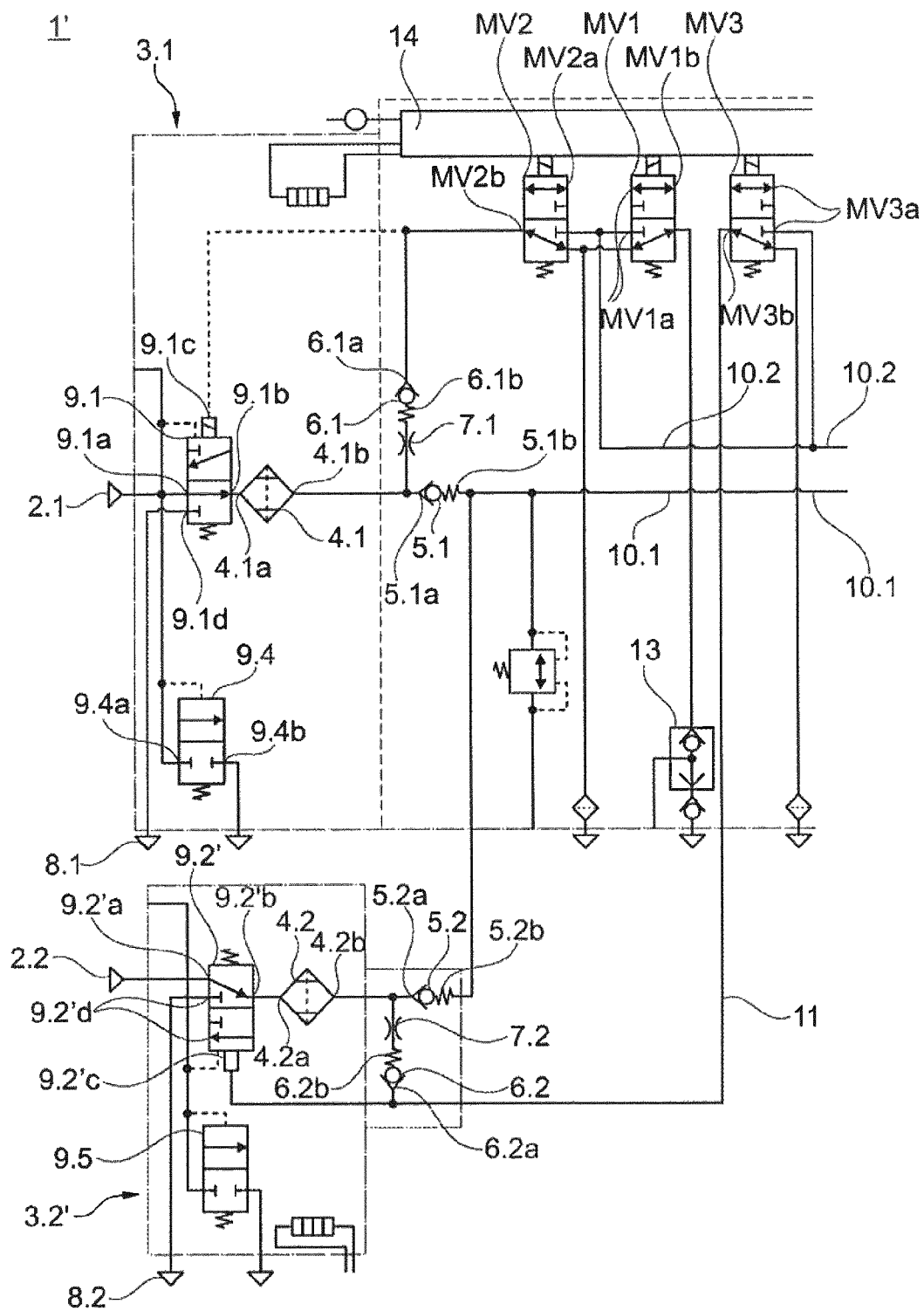
FIG. 2 shows a second exemplary embodiment of an air preparation device with a first and second air preparation component.

FIG. 2 illustrates a second exemplary embodiment of an air preparation device 1' with a first and second air preparation component 3.1; 3.2'.

In contrast to the first exemplary embodiment according to FIG. 1, the second exemplary embodiment according to FIG. 2 differs in particular in that the second inlet valve 9.2' is configured in the form of a 3/2-way directional control valve.

The first and second inlet valves 9.1; 9.2' according to FIG. 2 are therefore provided identically to each other.

Within this context, the venting valve 9.3, illustrated in FIG. 1, of the second air preparation component 3.2 is omitted.

By contrast, according to FIG. 2, the second air preparation component 3.2' also has a second drainage valve 9.5, identically to the first drainage valve 9.4.

The first and second air preparation components 3.1; 3.2' according to FIG. 2 therefore have substantially identical interconnections to a first or a second inlet valve 9.1; 9.2' and to a first or a second drainage valve 9.4; 9.5.

Alternatively, the first inlet valve 9.1 of the first air preparation component 3.1 can, of course, also be configured in the form of two 2/2-way directional control valves in accordance with the combination of second inlet valve 9.2 and venting valve 9.3 of the second air preparation component 3.2 according to FIG. 1.

THE LIST OF REFERENCE SIGNS ID AS FOLLOWS 1 air preparation device
2.1 first compressed air connection
2.2 second compressed air connection
3.1 first air preparation component
3.2 second air preparation component
3.2' second air preparation component
4.1 first air drier cartridge
4.1a input of the first air drier cartridge
4.1b output of the first air drier cartridge
4.2 second air drier cartridge
4.2a input of the second air drier cartridge
4.2b output of the second air drier cartridge
5.1 first main nonreturn valve
5.1a input of the first main nonreturn valve
5.1b output of the first main nonreturn valve
5.2 second main nonreturn valve
5.2a input of the second main nonreturn valve
5.2b output of the second main nonreturn valve
6.1 first regeneration nonreturn valve
6.1a input of the first regeneration nonreturn valve
6.1b output of the first regeneration nonreturn valve
6.2 second regeneration nonreturn valve
6.2a input of the second regeneration nonreturn valve
6.2b output of the second regeneration nonreturn valve
7.1 first regeneration throttle
7.2 second regeneration throttle
8.1 first regeneration output
8.2 second regeneration output
9.1 first inlet valve
9.1a input of the first inlet valve
9.1b output of the first inlet valve
9.1c control input of the first inlet valve
9.1d venting output of the first inlet valve
9.2 second inlet valve
9.2a input of the second inlet valve
9.2b output of the second inlet valve
9.2c control input of the second venting valve
9.2' second inlet valve
9.2'a input of the second inlet valve
9.2'b output of the second inlet valve
9.2'c control input of the second venting valve
9.2'd venting output of the second inlet valve
9.3 venting valve
9.3a input of the venting valve
9.3b output of the venting valve
9.3c control input of the venting valve
9.4 first drainage valve
9.4a input of the first drainage valve
9.4b output of the first drainage valve
9.5 second drainage valve
10.1 first pneumatic circuit output
10.2 second pneumatic circuit output
11 control line
MV1 first solenoid valve
MV1a input of the first solenoid valve
MV1b output of the first solenoid valve
MV2 second solenoid valve
MV2a input of the second solenoid valve
MV2b output of the second solenoid valve
MV3 third solenoid valve
MV3a input of the third solenoid valve
MV3b output of the third solenoid valve
13 rapid venting valve
14 control unit

The invention claimed is:

1. An air preparation device for a motor vehicle, comprising:
at least one first compressed air connection and a second compressed air connection; and
a first air preparation component and a second air preparation component;
wherein the first air preparation component has at least one first solenoid valve, a second solenoid valve and a third solenoid valve, a first air drier cartridge, a first main nonreturn valve, a first regeneration nonreturn valve, a first regeneration throttle and a first inlet valve,
wherein the second air preparation component has at least one second air drier cartridge, a second main nonreturn valve, a second regeneration nonreturn valve, a second regeneration throttle and a second inlet valve,
wherein the first solenoid valve and the second solenoid valve are for controlling the first air preparation component,
wherein a control line is configured so that the second air preparation component is connected to the third solenoid valve of the first air preparation component, and
wherein the second solenoid valve is configured so that an input of the second solenoid valve is connected to a second pneumatic circuit output and the output of the second solenoid valve is connected to the first regeneration nonreturn valve and to a control input of the first inlet valve.

2. The air preparation device of claim 1, wherein an output of the third solenoid valve is connected by the control line to an input of the second regeneration nonreturn valve and to a control input of the second inlet valve so that the second air preparation component is controllable by the third solenoid valve.

3. The air preparation device of claim 1, wherein an input of the first main nonreturn valve is connected to an output of the first air drier cartridge and an input of the second main nonreturn valve is connected to an output of the second air drier cartridge, and wherein an output of the first main nonreturn valve and an output of the second main nonreturn valve are each connected to a first pneumatic circuit output.

4. The air preparation device of claim 1, wherein the first inlet valve and/or the second inlet valve include a 3/2-way directional control valve, and wherein a venting output of the first inlet valve and/or the second inlet valve is connected to a first regeneration output or a second regeneration output.

5. The air preparation device of claim 1, further comprising:
a rapid venting valve configured so that an input of the first solenoid valve is connected to the second pneumatic circuit output and an output of the first solenoid valve is connected to the rapid venting valve.

6. An air preparation device for a motor vehicle, comprising:
- at least one first compressed air connection and a second compressed air connection; and
- a first air preparation component and a second air preparation component;
- wherein the first air preparation component has at least one first solenoid valve, a second solenoid valve and a third solenoid valve, a first air drier cartridge, a first main nonreturn valve, a first regeneration nonreturn valve, a first regeneration throttle and a first inlet valve,
- wherein the second air preparation component has at least one second air drier cartridge, a second main nonreturn valve, a second regeneration nonreturn valve, a second regeneration throttle and a second inlet valve,
- wherein the first solenoid valve and the second solenoid valve are for controlling the first air preparation component,
- wherein a control line is configured so that the second air preparation component is connected to the third solenoid valve of the first air preparation component, and
- wherein the first regeneration throttle is integrated in the second solenoid valve and/or in that the second regeneration throttle is integrated in the third solenoid valve.

* * * * *